Figure 1:
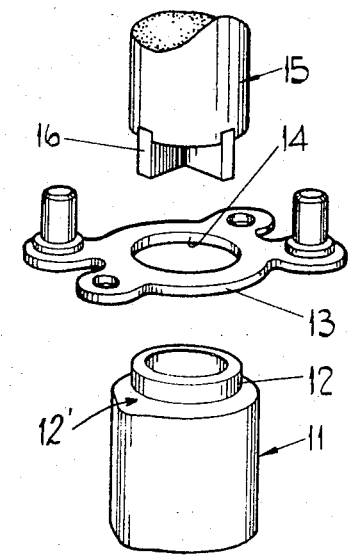

United States Patent [19]
Potter

[11] 3,867,609

[45] Feb. 18, 1975

[54] METHOD OF CONNECTING TWO PARTS

[75] Inventor: Bernard Alan Potter, Birmingham, England

[73] Assignee: The Lucas Electric Co., Ltd., Birmingham, England

[22] Filed: Jan. 31, 1974

[21] Appl. No.: 438,341

[30] Foreign Application Priority Data
Feb. 3, 1973 Great Britain...................... 5463/73

[52] U.S. Cl................ 219/150 V, 219/50, 219/107
[51] Int. Cl............................................. B21j 5/08
[58] Field of Search ......... 219/107, 150 V, 105, 50, 219/149, 78

[56] References Cited
UNITED STATES PATENTS
1,562,419 11/1925 Bowen............................ 219/150 V
2,871,340 1/1959 Wessel............................ 219/150 V
3,282,615 11/1966 Darby et al..................... 219/107 X Primary Examiner—J. V. Truhe
Assistant Examiner—N. D. Herkamp
Attorney, Agent, or Firm—Harness, Dickey & Pierce

[57] ABSTRACT

A method of connecting a sintered part having an integral sleeve with another part which is apertured to receive the sleeve. The method comprises interengaging the two parts with the sleeve extending through the aperture, and performing a hot riveting operation at a plurality of spaced locations on the projecting portion of said sleeve of said sintered part.

5 Claims, 2 Drawing Figures

PATENTED FEB 18 1975

3,867,609

METHOD OF CONNECTING TWO PARTS

This invention relates to a method of connecting two parts and is particularly concerned with connecting a sintered part having an integral sleeve with another part apertured to receive the sleeve.

For certain uses it is sometimes desired to connect a sintered part having a sleeve thereon with a metal plate which is apertured to receive the sleeve. By performing an ordinary hot riveting operation on the sintered metal part so as to spread the sleeve annularly outwardly, it is found that a substantial portion of the sintered metal cracks, deforms and crumbles.

It is an object of the present invention to provide a method of connecting a sintered metal part to another part in which the above disadvantage is obviated or mitigated.

According to the present invention, there is provided a method of connecting a sintered metal part including an integral sleeve to another part having therein an aperture for receiving said sleeve, comprising the steps of interengaging the two parts with said sleeve extending through said aperture and performing a hot riveting operation at a plurality of spaced locations on the projecting portion of said sleeve of said sintered part.

By performing the hot riveting operation at a plurality of spaced locations it has been found that the two metal parts are efficiently connected together and that a crumbling of the metal is obviated or mitigated.

The said another part may or may not be of sintered metal.

Preferably, the hot riveting operation is effected by bringing a configurated electrode into engagement with said sleeve of said sintered part at the plurality of spaced locations, passing a current through the sintered part for a predetermined time, allowing the sintered part to cool at least partially, and removing the electrode from the at least partially cooled sinted part.

Figure 2:
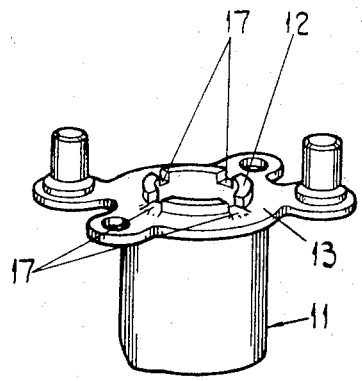

One example of the present invention will now be described with reference to the accompanying drawings wherein FIG. 1 is an exploded view of two components to be interconnected and a tool, and FIG. 2 is a view of the components of FIG. 1 interconnected.

Referring to the drawings, a method of connecting a sintered metal, cylindrical cam 11 having a projecting sleeve 12 and a shoulder 12' to a metal plate 13 involves bringing the shoulder 12' of the cam 11 into engagement with the plate 13 so that the sleeve 12 on the cam projects through an aperture 14 in the plate. The assembly of cam and plate is then subjected to a hot riveting operation by mounting the cam in a fixed electrode (not shown) so that the projecting end of the sleeve 12 lies under a movable electrode 15 having a lower end 16 of cruciform shape, and bringing the end 16 of the electrode into contact with the projecting end of the sleeve 12 with a force of 1,000 lbs. A 50 cycles per second alternating current of 10,000 amps. is passed between the electrodes for a duration of 15 cycles. During this step, localized portions 17 (FIG. 2) of the projecting end of the sleeve 12 are deformed outwardly to engage the plate 13, said localized portions 17 being spaced 90° apart around the said end of the sleeve. With the movable electrode 15 still in contact with the new deformed sleeve 12, the force is maintained without current flow to allow the sintered metal part partially to cool. After this, the movable electrode 15 is lifted out of contact with the deformed sleeve and the assembly of cam and plate removed from the hot riveting machine.

It will be appreciated from the above that the electrodes are applied only to the sintered metal part so that the metal plate is only subjected to indirect heating and pressure.

In the above example, the metal plate employed was a non-sintered metal plate. However, it is within the scope of the invention to connect two sintered metal parts together. The parameters of the riveting operation will of course be determined at least in part by the nature of the components to be interconnected.

I claim:

1. A method of connecting a sintered metal part including an integral sleeve having a shoulder thereon to another part having therein an aperture for receiving said sleeve, comprising the steps of interengaging the two parts with said sleeve extending through said aperture and said part having a portion resting on said shoulder and performing a hot riveting operation at a plurality of spaced locations on the projecting portion of said sleeve of said sintered part.

2. A method as claimed in claim 1 wherein said other part is sheet metal.

3. A method as claimed in claim 1 wherein said other part is sintered metal.

4. A method as claimed in claim 1 wherein the hot riveting operation is effected by bringing a configurated electrode into engagement with said sleeve of said sintered part at the plurality of spaced locations, passing a current through the sintered part for a predetermined time, allowing the sintered part to cool at least partially and removing the electrode from the at least partially cooled sintered part.

5. A pair of parts interconnected by the method claimed in claim 1.

* * * * *